United States Patent Office 3,484,900
Patented Dec. 23, 1969

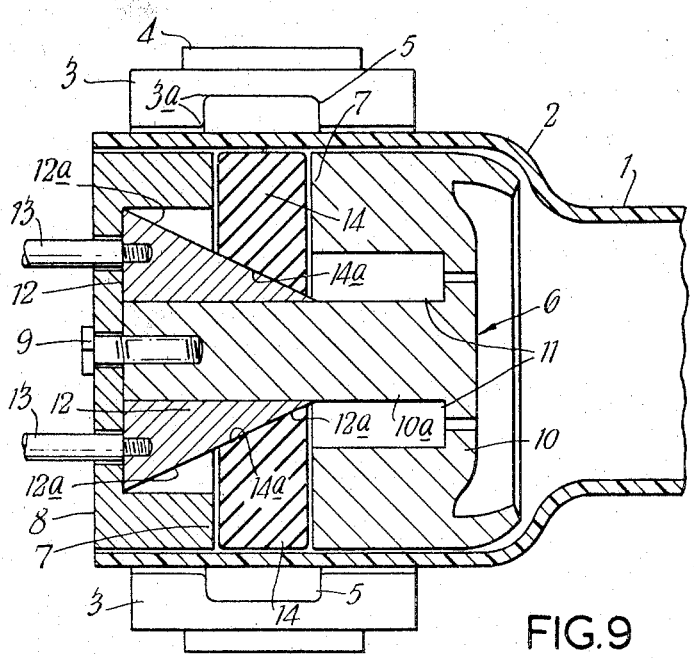

3,484,900
TUBING AND PIPING OF THERMOPLASTICS MATERIAL
David Harold Sands, Charing, and Ronald Broome, Stanford, England, assignors to Chemidus Plastics Limited, Ashford, England, a British company
Filed May 5, 1967, Ser. No. 636,354
Claims priority, application Great Britain, May 25, 1966, 23,282/66
Int. Cl. B29c 3/00
U.S. Cl. 18—19                     10 Claims

ABSTRACT OF THE DISCLOSURE

Apparatus and method for forming an annular internal groove in a length of plastics pipe. A mandrel for insertion in the pipe, the mandrel having an annular recess which houses a radially deformable moulding ring. The moulding ring being radially deformable from the recess to deform the pipe into the groove of a mould surrounding the pipe by a mechanical thrust member associated with the mandrel. The thrust member either acting directly on the moulding ring or acting on an intermediate thrust ring.

---

This invention relates to tubing and piping made of thermoplastics material and is directed towards a method of, the apparatus for, forming an internal groove or recess in the tube or pipe; the formed groove or recess being intended for the reception of a sealing ring in a manner well known in the art.

The groove or recess is usually formed in a preformed socket on a first tube or pipe so that with a sealing ring seated in the groove a second tube or pipe can be inserted into the socket to make a sealed joint.

Whilst it is possible to form various tube and pipe fittings (such as elbows, sockets and the like) by injection moulding when they are of relatively short length, it has not hitherto been found practicable to form such sockets or shaped parts integrally with a relatively long length of tubing or piping (hereinafter termed "pipe" or "piping") because this rules out injection moulding.

In consequence, where grooves and similar formations are required on a long length of piping, it is generally the practice to make a short specially shaped piece such as a grooved socket, by injection moulding and then to weld this to a plain length of extruded thermoplastics pipe.

The present invention aims at providing a method of, and apparatus for, forming an annular internal groove or recess in a pipe (or in a socket on the pipe) made of thermoplastics material, irrespective of the fact that such pipe may be longer than can conviently be formed by injection moulding. The invention is a modification of our co-pending patent applications Nos. 24,563/65 and 53,609/65.

According to the present invention there is provided a method of forming an annular internal groove or recess on a length of piping of tubular thermoplastics material which includes the steps of assembling around the pipe, at the place where the groove is to be formed, a split cavity mould having an internal annular cavity equivalent in shape to the desired external profile of the finished groove in the pipe; blocking the pipe internally to define an annular space at the zone where the groove is to be formed; providing a radially expandable moulding ring within the annulus and mechanical means for imparting radial expansion to the ring within the annulus; locally heating the pipe to soften it at the zone where the groove is to be formed; actuating the mechanical means to impart radial expansion to the moulding ring to cause it to deform radially outwardly from the annulus and thereby to mould the softened part of the wall of the pipe into the cavity in the mould; cooling the pipe to set the deformed portion thereof; dismantling the split cavity mould and removing the blockage.

Further according to the present invention there is provided apparatus for forming an annular internal groove or recess on a length of piping of tubular thermoplastics material which includes a split cavity mould having an internal annular cavity equivalent in shape to the desired external profile of the groove to be formed in the pipe; means for blocking the pipe internally to define an annular space at the zone where the groove is to be formed in the pipe; a radially expandable moulding ring located in the annulus and mechanical means associated with the moulding ring whereby radial expansion can be imparted to the ring to urge it from the annulus.

In a preferable form of carrying out the method according to the present invention, the pipe is blocked internally to define the annular space at the zone where the groove is to be formed. In the core of the annular space is located the mechanical means for imparting radial expansion to a deformable moulding ring of solid elastomeric material which surrounds it to fill the annulus. The moulding ring has an external axial length approximately equal to the internal axial length of the groove so that after having previously heated the pipe to soften it, by actuating the mechanical means the moulding ring can be deformed to be urged radially outwardly from the annulus to mould the softened part of the wall of the pipe into the cavity in the mould.

The mechanical means for imparting radial expansion to the moulding ring is preferably provided by an annular thrust member capable of linear movement normal to the annulus in a direction parallel to the axis of the pipe at the part where the groove is to be formed therein. The thrust member is provided with an inclined thrust surface which abuts a complementary inclined surface associated with the surrounding expandable moulding ring so that during axial movement of the thrust member the thrust surface slides over the inclined surface associated with the moulding ring to impart radial expansion or contraction to the expandable moulding ring.

The inclined thrust surface can abut directly against a complementary surface of the moulding ring but it is preferable that a thrust ring is provided intermediate to the thrust member and the moulding ring so that the thrust member abuts a complementary inclined surface of the thrust ring. The thrust ring can conveniently be made in a plurality of radial thrust sections of rigid material so that each section at the outer circumference of the thrust ring so formed can be bonded or otherwise fixedly secured to the inner edge of the moulding ring. The thrust sections are so arranged that in the neutral, unexpanded condition of the moulding ring they form a solid, uninterrupted thrust ring, but when the thrust member is moved axially across the annulus the thrust sections can be moved radially outwardly on the moulding ring to be circumferentially spaced by such radial movement during which the moulding ring is urged radially outwardly. The thrust ring thus ensures that uniform expansion is imparted to the moulding ring by the thrust member.

If required each radial thrust section can be provided with a hole passing therethrough to provide, when the thrust sections are located in adjacent positions to form the continuous uninterrupted thrust ring, an endless hole in the thrust ring. The endless hole is preferably of circular cross section in its axial direction and is preferably located to be concentric with the thrust ring. Housed in the endless hole to pass through each thrust section is an endless spring or other resilient member which is adapted to bias the thrust sections radially inwards to form the continuous thrust ring. In this modification the outer circumference of each radial thrust section need not be secured to the inner edge of the moulding ring.

Examples of suitable materials from which the moulding ring can be made are natural rubbers, synthetic rubbers, neoprene and similar elastomeric materials.

During the formation of a socket on a pipe, the wall thickness of the pipe at the socket tends to be relatively decreased; moreover, due to the increase in diameter of the socket, and the fact that it operates at a similar pressure to the remaining length of the pipe, the thermoplastics material at the socket is likely to be overstressed in use.

The disadvantage due to the decrease in wall thickness of the pipe during deformation of the pipe to form the plain socket may be overcome by swaging the pipe end, so as to increase the wall thickness after forming the plain socket. However, it is also desirable to increase the wall thickness of the pipe or of the socket by an extra amount locally, to allow for the formation of the groove or recess to be formed therein.

The wall thickness of the pipe can be increased by an extra amount locally by providing the pipe with a sleeve of thermoplastics material at a position on the pipe at which the socket and/or groove are to be formed. An extruded thermoplastics sleeve of the required length and wall thickness is heated, positioned on the pipe adjacent one end thereof and allowed to cool to shrink on to the pipe. Preferably the internal diameter of the sleeve becomes rigidly attached to the pipe. The combined wall formed by the pipe and the sleeve can then be heated and a plain socket and/or groove formed.

Preferably the operations for forming a groove or recess in a pipe socket comprise the sequence of heating the sleeve, shrinking the sleeve on the pipe at the position adjacent one end thereof, heating the mould and combined pipe and sleeve, forming a plain socket of the required length, forming the groove or recess, cooling the mould and combined pipe and sleeve and removing the grooved pipe and sleeve. When the aforementioned sequence of operations is not continuous, i.e. the pipe and sleeve are permitted to cool, then the combined pipe and sleeve are heated prior to each operation preceding the cooling operation.

The invention is particularly applicable to the provision of a groove or recess in pipes such as cold water and rainwater pipes made of polyvinyl chloride and similar materials.

One embodiment of the present invention will now be described, by way of example only, and with reference to the accompanying diagrammatic drawing, in which.

Figure 1:
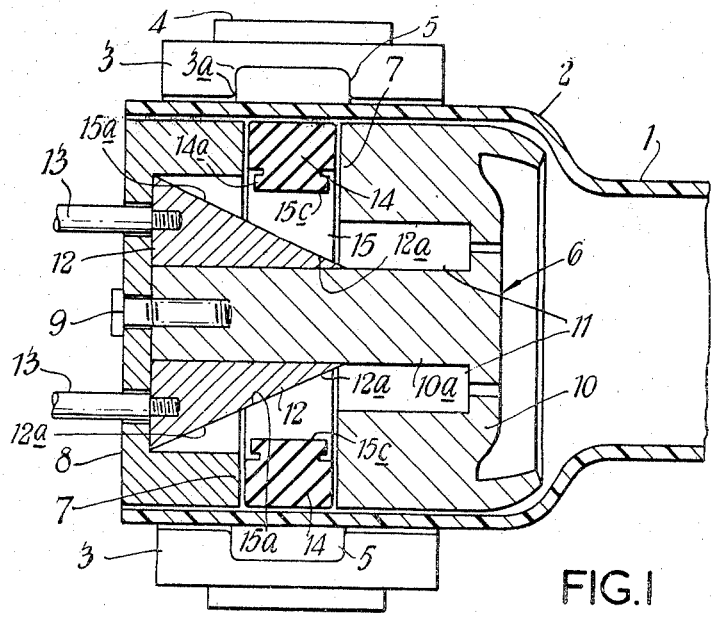
FIG. 1 illustrates an axial cross-section of the end portion of a thermoplastics tubular pipe and apparatus according to the present invention and shows the pipe blocked internally prior to deformation of the wall of the pipe into the cavity in the mould.
Figure 5:
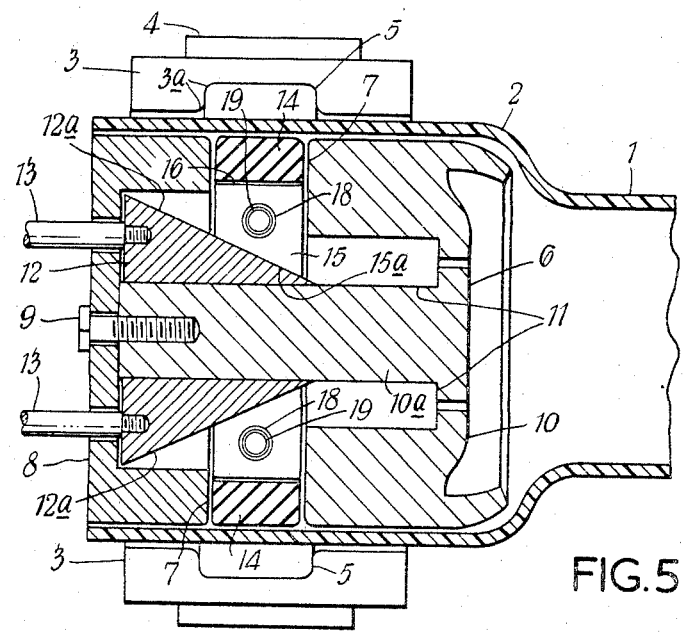
FIG. 5 is a similar cross section to that in FIG. 1 and illustrates the thrust ring modified to include an endless spring member which biasses the thrust sections of the thrust ring radially inwards.
Figure 6:
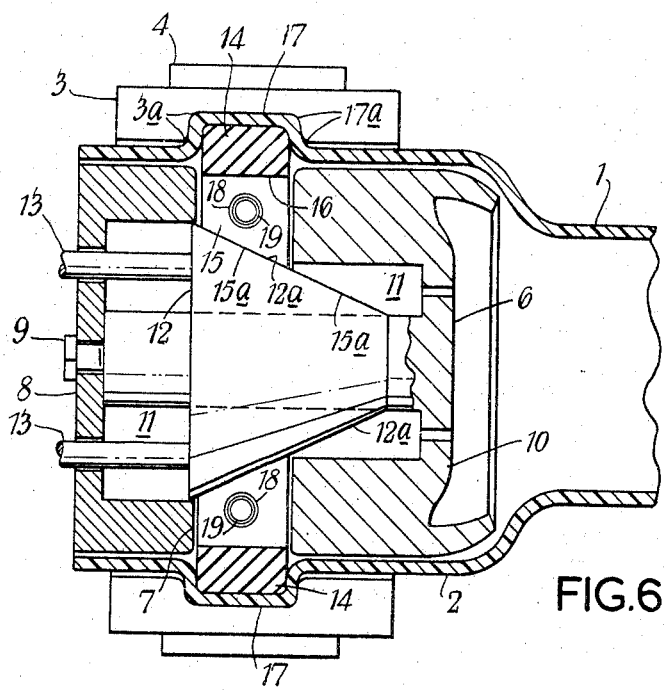
Figure 7:
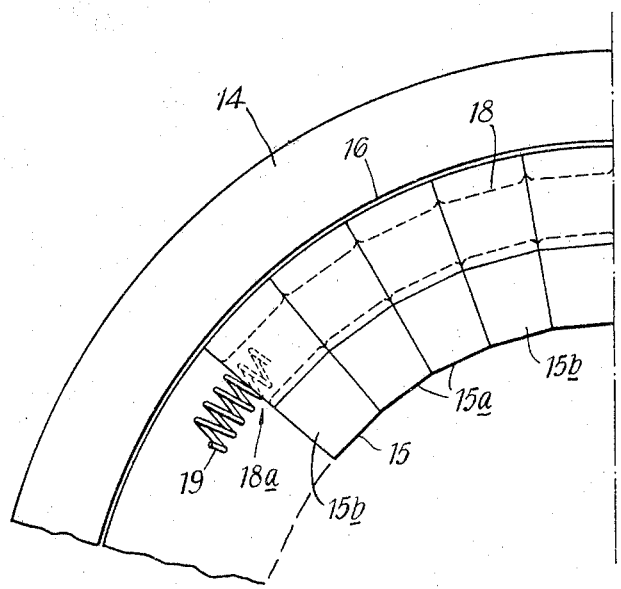
Figure 8:
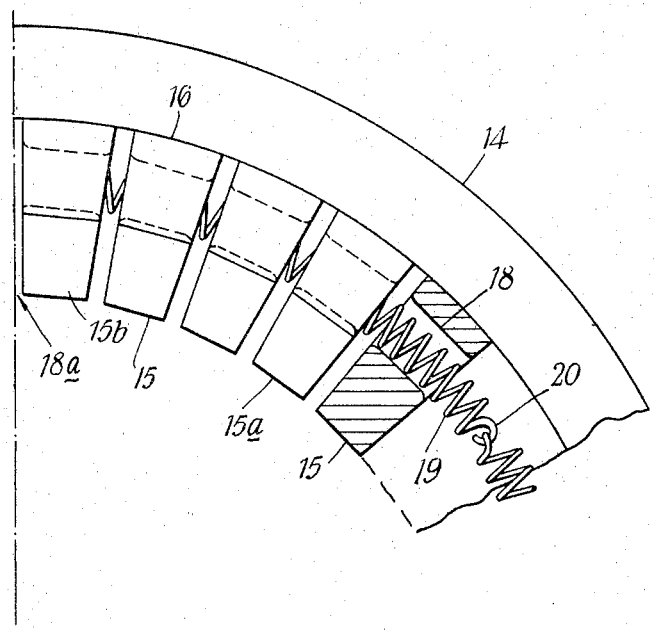

FIG. 6 is a similar cross section to that in FIG. 5 and illustrates the way in which the wall of the pipe is deformed by the moulding ring when the latter is urged radially outwardly; and FIGS. 7 and 8 illustrate part of the moulding ring and modified thrust ring of FIGS. 5 and 6 before and after expansion respectively; and FIG. 9 is a similar cross section to that shown in FIG. 1 and illustrates a modification in which the thrust ring is omitted and the moulding ring directly slidably engages thrust means mounted in the mandrel; the apparatus in FIG. 9 being illustrated prior to deformation of the wall of the pipe; and FIG. 10 is a similar cross section to that shown in FIG. 9 and illustrates the way in which the wall of the pipe is deformed when the mounting ring is urged radially outwardly.

In the several figures of the drawings, like members or parts have been accorded like reference numerals for ease of description.

Referring firstly to FIG. 1, a pipe 1 of tubular thermoplastics material is provided with a socket 2 on which socket is to be formed an annular internal groove or recess. A groove or recess is often required on the socket of a pipe to accommodate an "O-ring" or similar seal which is necessary for making the joint of two interconnecting lengths of piping leakproof. Assembled around the socket 2 is a split cavity mould 3 having clamping means shown generally at 4 and an internal annular cavity 5. The cavity 5 is equivalent in shape to the desired external profile of the finished groove to be formed on the pipe. The split cavity mould 3 is positioned around the socket 2 so that the cavity 5 is located at the place of the socket 2 where the groove portion of the pipe is to be formed.

The socket 2 is provided with an internal blockage in the form of a mandrel 6 which has an annular space in the form of a moulding ring housing 7. The housing 7 can conveniently be formed by a cylindrical end plate 8 which is connected by bolts 9 to a cylindrical body member 10. The end plate 8 abuts a cylindrical portion 10a of the body member about which portion the end plate and body member are so shaped to define an annular thrust cavity 11 which communicates through the housing 7 with the peripheral surface of the mandrel 6.

Slidably mounted on, and surrounding, the peripheral surface of the cylindrical portion 10a in the thrust cavity 11 is a conically shaped thrust member 12 which, in the present embodiment, provides the mechanical means for imparting radial movement to the moulding ring. The thrust member 12 is provided with an inclined thrust surface 12a and is capable of axial sliding movement through the thrust cavity 11 across the annulus formed by the housing 7 in the mandrel 6. Axially controlled sliding movement of the thrust member 12 through the thrust cavity 11 is obtained by control rods 13 which communicate with the thrust member through suitable apertures in the end plate 8.

Figure 3:
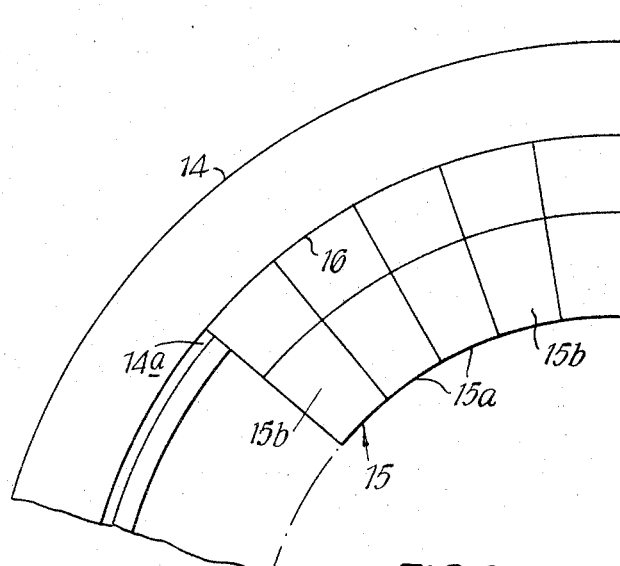
FIGS. 3 and 4 illustrate part of the moulding ring and associated thrust ring before and after expansion respectively.
Figure 4:
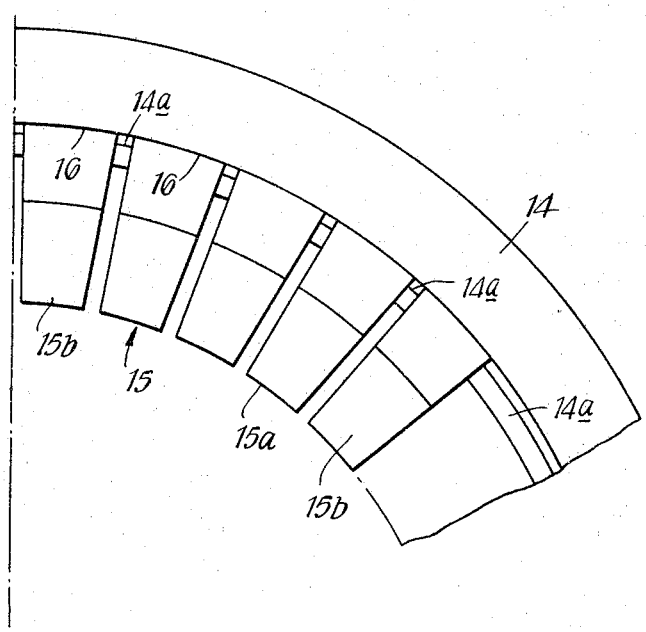

Located in the annulus formed by the housing 7 is an expandable moulding ring 14 of solid elastomeric material. The moulding ring 14 surrounds the thrust member 12 and has associated therewith a thrust ring 15 which is located between the moulding ring 14 and the thrust member 12 and surrounds the thrust member 12. The thrust ring 15 has an inclined inner surface 15a which is complementary to and abuts the thrust surface 12a. Consequently during axial movement of the thrust member 12 the inclined surfaces 12a and 15a slide over each other to impart radial movement to the thrust ring 15. It will be seen from FIGS. 3 and 4 that the thrust ring is made in a plurality of radial thrust sections 15b of rigid material; each section 15b is securely attached by bonding or otherwise at the outer circumference 16 of the thrust ring so formed to the inner edge of the moulding ring 14. As will be seen in FIGS. 1 and 2, the outer circumference of the thrust ring is provided with a flanged recess 15c which engages with a complementary flanged rib 14a provided on the inner edge of the moulding ring 14 to securely attach the two rings. The thrust sections 15b are so arranged that in the neutral, unexpanded condition of the moulding ring (see FIG. 3) they form a solid uninterrupted thrust ring, and when the thrust member 12 is moved axially the thrust sections are moved radially outwardly on the moulding ring to become circumferentially spaced (see FIG. 4) by such radial movement.

The deformable moulding ring 14 has an external axial length fractionally less than the intended internal axial length of the grove to be formed on the pipe. In its unstressed condition the elastomeric moulding ring 14 has an external diameter slightly less than the internal diameter of the socket 2. The moulding ring 14 has an external surface 14 which is preferably cylindrical. It will be realised however that the external surface of the moulding ring can be provided of an alternative shape which is governed by the desired shape of the finished groove.

In forming an annular internal groove or recess on the socket 2, the socket is heated at the zone where the groove is to be formed, the split cavity mould assembled around the pipe and the blockage in the form of the mandrel 6 with its asociated thrust member, thrust ring and moulding ring positioned in the socket 2 so that the housing 7 is located at the zone where the groove is to be formed—see FIG. 1.

Figure 2:
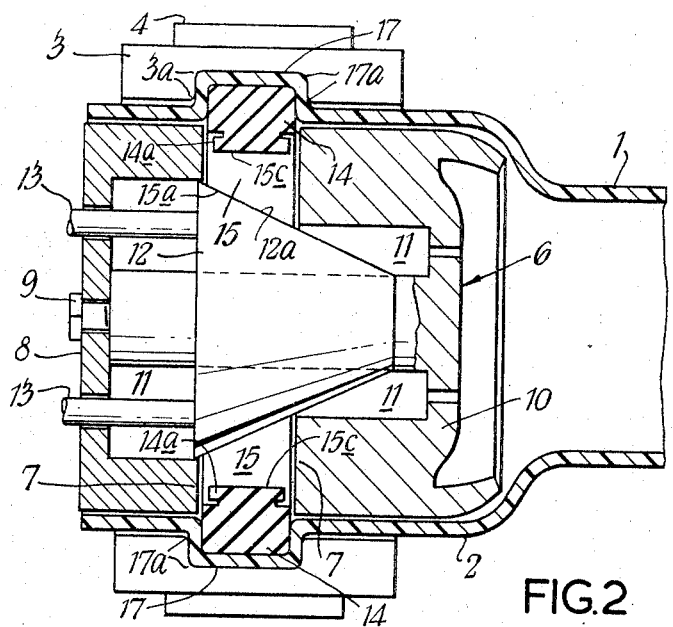
FIG. 2 is a similar cross-section to that in FIG. 1 and illustrates the way in which the wall of the pipe is deformed by the moulding ring when the latter is urged radially outwardly.

Referring now to FIG. 2, the thrust member 12 is moved axially through the thrust cavity 11 by the control rods 13, thereby causing the thrust ring 15 to move radially outwardly. Such radial movement of the thrust ring 15 causes the moulding ring 14 to deform and be urged radially outwardly through the housing 7 to mould the softened part of the socket 2 into the cavity 5 of the mould 3, thus forming an annular internal groove or recess 17 on the socket 2. The socket is then cooled until the thermoplastics material is set and the thrust member 12 is withdrawn to its original position to permit the moulding ring 14 to return into its housing 7, after which the mandrel 6 can be removed from within the socket 2. The split cavity mould 3 is finally removed by releasing the clamping means 4.

During the deformation of the softened wall of the socket 2 into the cavity 5 in the mould 3, it has been found that the corners 17a of the internal groove or recess 17 so formed in the socket become strained. To reduce such strain on the thermoplastics material at the corners 17a of the groove the annular edges 3a of the cavity 3 are preferably "rounded-off" as illustrated.

In the modified construction illustrated in FIGS. 5 to 8, each radial thrust section 15b is provided with a hole 18 passing therethrough. The holes 18 are so formed that when the thrust sections are located in adjacent positions to form the continuous uninterrupted thrust ring 15 (as illustrated in FIG. 7) an endless hole 18a is provided in the thrust ring. The hole 18a is of circular cross section in its axial direction and is located to be concentric with the thrust ring 15. Housed in the hole 18a to pass through each thrust section 15 is an endless helical spring 19 the ends of which are joined at 20. The spring 19 is tensioned to bias the thrust sections 15b radially inwards to form the continuous thrust ring and thereby cause the inclined surfaces 15a to remain in contact with the inclined surface 12a of the thrust member 12. In this modification, the outer circumferential surface 16 of the thrust ring 15 and the inner surface of the moulding ring 14 are of cylindrical form and are not attached so that during radial expansion of the thrust ring 15 the cylindrical surfaces abut and the moulding ring is urged radially outwards to the position shown in FIG. 6. After a moulding operation and withdrawal of the thrust member 12 the thrust sections move radially inwards under the action of spring 19 and the moulding ring moves radially inwards by its natural resilience.

It will be appreciated that the thrust sections 15 in FIGS. 5 to 8 can be fixedly secured to the moulding ring in a similar manner to the construction in FIGS. 1 to 4.

In the modification illustrated in FIGS. 9 and 10, the thrust ring 15 as referred to in FIGS. 1 to 8 has been omitted and the moulding ring 14 communicates in direct sliding engagement with the inclined surface 12a of the thrust member 12. The inner peripheral surface 14a of the moulding ring 14 is of frusto-conical form to be complementary to the inclined thrust surface 12a and it will be apparent that operation of the apparatus shown in FIGS. 9 and 10 is effectively the same as above described with reference to FIGS. 1 to 8.

We claim:
1. In apparatus for forming a circumferential internal groove on a length of piping of tubular thermoplastics material, comprising
   split cavity mould means for receiving a pipe, said mould means defining an internal annular cavity into which the wall of the pipe is to be moulded to form the groove;
   hollow cylindrical mandrel means for insertion axially into the pipe;
   circumferentially disposed and radially extending ring housing means defined in and extending through the wall of said mandrel means for location in radial alignment with said annular cavity when the mandrel means is inserted into the pipe;
   axially movable thrust means mounted within the mandrel means, said thrust means having a peripheral thrust surface symmetrical about the axis of the mandrel means and axially inclined relative thereto;
   and radially expandable ring means located, and axially confined, in said housing means to encircle said thrust means and communicate in sliding engagement with said thrust surface, said ring means being radially outwardly displaceable from its housing means to deform the pipe into said annular cavity by movement of the thrust means in one sense of axial direction through said mandrel means and ring means.

2. In apparatus as claimed in claim 1 wherein said radially expandable ring means comprises a moulding ring the internal surface of which communicates in sliding engagement with said thrust surface.

3. In apparatus as claimed in claim 1 wherein said radially expandable ring means comprises a moulding ring and thrust ring means, said thrust ring means being located radially between said moulding ring and said thrust surface and communicating in sliding engagement with said thrust surface.

4. In apparatus as claimed in claim 3 wherein said thrust ring means comprises a plurality of radially extending thrust sections.

5. In apparatus as claimed in claim 4 and further comprising resilient means interconnecting said thrust sections and biasing said thrust sections radially inwardly into engagement with said thrust surface.

6. In apparatus as claimed in claim 5 wherein said resilient means comprises an endless spring member and each of said thrust sections defines an aperture which extends therethrough, said apertures co-operating to define a spring housing which extends through said thrust ring means to surround said thrust surface and within which spring housing said endless spring member is housed.

7. In apparatus as claimed in claim 3 wherein said thrust ring means is fixedly secured at its outer peripheral surface to the inner peripheral surface of said moulding ring.

8. In apparatus as claimed in claim 1 and further comprising carrying means axially extending within said mandrel means, said thrust means being slidably mounted on said carrying means and said thrust surface is of conical form co-axial with the axis of the mandrel means.

9. In apparatus as claimed in claim 8 wherein said mandrel means comprises a two part structure, each of said parts having a substantially cylindrical external profile and further comprises assembly means by which said parts are co-axially secured together to form said hollow mandrel means and to define said ring housing means, and in which said carrying means extend axially between said parts and is secured to both of said parts to maintain said parts in axial relationship.

10. In apparatus as claimed in claim 1 wherein said said ring means has an unstressed external diameter not greater than the external diameter of said mandrel means and has an axial length substantially equal to the intended axial length of the groove to be formed in the pipe.

References Cited

UNITED STATES PATENTS

| 729,099 | 5/1903 | Smith. |
| 2,458,854 | 1/1949 | Hull et al. |
| 2,728,127 | 12/1955 | Armstrong. |
| 3,160,920 | 12/1964 | Busch. |
| 3,205,535 | 9/1965 | Niessner et al. ____ 18—19 XR |
| 3,341,894 | 9/1967 | Flaming _____ 18—19 |

FOREIGN PATENTS

| 640,417 | 11/1965 | Netherlands. |

WILLIAM J. STEPHENSON, Primary Examiner